US005570948A

United States Patent [19]

Menke et al.

[11] Patent Number: 5,570,948
[45] Date of Patent: Nov. 5, 1996

[54] FLASHLIGHT WITH REMOVABLE LAMP SECTION FOR FIRE FIGHTING AND OTHER SPECIALIZED USES

[75] Inventors: W. Kenneth Menke; W. Kenneth Menke, III, both of Glendale, Mo.

[73] Assignee: The Fire Products Company, Webster Groves, Mo.

[21] Appl. No.: 560,461

[22] Filed: Nov. 17, 1995

[51] Int. Cl.$^6$ ..................................................... F21L 7/00
[52] U.S. Cl. .......................... 362/191; 362/194; 362/199
[58] Field of Search ................................... 362/190, 191, 362/194, 199

[56] References Cited

U.S. PATENT DOCUMENTS

| | | |
|---|---|---|
| 1,025,026 | 4/1912 | Sprague . |
| 1,691,400 | 11/1928 | Mitchell . |
| 1,752,343 | 1/1930 | Kann . |
| 1,757,889 | 5/1930 | Wheat . |
| 1,820,960 | 9/1931 | Champagne et al. . |
| 1,900,906 | 3/1933 | Brown . |
| 1,996,577 | 4/1935 | Humeston ............................. 362/191 |
| 2,071,557 | 2/1937 | Miyaoka . |
| 2,164,898 | 7/1939 | Brown . |
| 2,275,765 | 3/1942 | Hummert et al. . |
| 2,320,917 | 6/1943 | Ely .......................................... 362/194 |
| 2,816,277 | 12/1957 | Salkowski . |
| 3,084,248 | 4/1963 | Packer et al. ........................... 362/199 |
| 3,560,730 | 2/1971 | Morton . |
| 3,601,595 | 8/1971 | Kivela . |
| 3,735,119 | 5/1973 | Williams . |
| 3,953,768 | 4/1976 | Meredith et al. . |
| 4,092,580 | 5/1978 | Prinsze . |
| 4,298,913 | 11/1981 | Lozar . |
| 4,345,304 | 8/1982 | Penney et al. . |
| 4,400,763 | 8/1983 | Kribs et al. . |
| 4,428,033 | 1/1984 | McBride . |
| 4,533,982 | 8/1985 | Kozar . |
| 4,535,391 | 8/1985 | Hsiao . |
| 4,542,447 | 9/1985 | Quakenbush . |
| 4,750,095 | 6/1988 | Huang . |
| 4,916,594 | 4/1990 | Headley . |
| 4,931,913 | 6/1990 | Hwang . |
| 5,003,450 | 3/1991 | Burton et al. . |
| 5,115,382 | 5/1992 | Smith . |
| 5,217,297 | 6/1993 | Yuen . |
| 5,239,451 | 8/1993 | Menke et al. . |
| 5,337,226 | 8/1994 | Wang et al. . |
| 5,357,411 | 10/1994 | Menke et al. . |
| 5,400,231 | 3/1995 | Huang . |

*Primary Examiner*—Carroll B. Dority
*Attorney, Agent, or Firm*—Howell & Haferkamp, L.C.

[57] ABSTRACT

The present invention relates to a flashlight for use by fire fighters and for use in other areas where it is desirable to interchangeably use a flashlight either carried in hand or hands free with a lamp portion attached to the user's clothing or helmet and the body portion separately attached elsewhere to the user's clothing. More particularly, the present invention relates to a flashlight comprising a body portion configured to contain batteries and an illuminating lamp section wherein the lamp section is separable from the body of the flashlight. The present invention permits the lamp section to be attached directly to the body of the flashlight in several different adjusted positions, or to be separated from the body of the flashlight and attached elsewhere such as clothing, helmets, belts, or other structures that may not be sufficiently stable to support the weight of the entire flashlight.

22 Claims, 6 Drawing Sheets

FLASHLIGHT WITH REMOVABLE LAMP SECTION FOR FIRE FIGHTING AND OTHER SPECIALIZED USES

BACKGROUND OF THE INVENTION

1. Field of the Invention

The present invention pertains to improvements to a flashlight system of the type disclosed in U.S. Pat. Nos. 5,239,451 and 5,357,411, filed on Aug. 31, 1992 and Jun. 25, 1993, respectively, and incorporated herein by reference. More particularly, the present invention pertains to a flashlight for use by fire fighters and for use in other specialized areas. The flashlight comprises a body that contains one or more batteries for powering the flashlight, and a lamp housing that is separable from the body, but maintains electrical communication with the power supply carried in the body via electrical cable.

1. Description of the Related Art

Flashlights are known in the prior art having various different configurations and sizes. A small number of prior art flashlights have been specifically designed for use in the many different situations encountered by fire fighters as well as other occupations.

In some situations, flashlights are conveniently and effectively used when carried in hand. In other situations, it is more convenient and effective to attach the flashlight to a helmet, belt, or the protective clothing or equipment worn by the fire fighter to free the fire fighter's hands for other purposes. For example, it is often desirable to suspend the flashlight with its lamp positioned on the fire fighter's helmet or on the chest area of protective clothing so that the flashlight beam is directed along the fire fighter's line of sight as the fire fighter moves freely about. However, it is cumbersome for a fire fighter, wanting to use the flashlight hands-free for prolonged periods of time, to have the entire weight of the flashlight structure suspended from high up on the clothing or on the helmet worn by the fire fighter. Therefore, various different types of flashlights have been developed where the lamp portion can be separated from the body of the flashlight containing the power source. Examples of these are disclosed in the U.S. patents nos. of Lozar U.S. Pat. No. 4,298,913; Brown U.S. Pat. No. 2,164,898; Miyaoka U.S. Pat. No. 2,071,557 land Wheat U.S. Pat. No. 1,757,889. Separation of the lightweight lamp from the body of the flashlight permits the weight of the batteries contained in the body of the flashlight to be carried in any manner most convenient to the fire fighter, for example from a belt around the waist, while the lighter weight lamp portion is more comfortably attached to a helmet, clothing, or other structure. However, each of these prior art flashlights are disadvantaged in that they have no provision for conveniently storing the length of wiring connecting the lamp to the power source. The U.S. Patents of Brown '898 and Miyaoka '557 show storage compartments provided for the wiring, but the wiring must be bunched up and stuffed into the compartment when stored.

It is also often desirable to have a lamp housing on a flashlight that is capable of being moved to several adjusted positions relative to the body of the flashlight containing the power source. This enables the fire fighter or other user of the flashlight to position the body of the flashlight on a support surface and direct the lamp housing of the flashlight to a desired adjusted position to direct the light beam to a particular area. With such a feature on the flashlight, the flashlight can be placed on the support surface with its light beam directed to a particular area of work and does not require a user to hold the flashlight with its beam directed to the area of work. Flashlights of this type are also known in the prior art and are disclosed in the U.S. patents of Champagne et al. U.S. Pat. No. 1,820,960; Kivela U.S. Pat. No. 3,601,595; Penney et al. U.S. Pat. No. 4,345,304; Kozar U.S. Pat. No. 4,533,982; and Yuen U.S. Pat. No. 5,217,297.

However, many prior art flashlights that are equipped with a lamp housing connection to the power source of the flashlight body that enables the lamp housing to be moved to a variety of positions relative to the flashlight body do not permit the lamp housing to be separated from the flashlight body. And in prior art flashlights where an adjustably positioned lamp housing on the flashlight body is separable from the body to be attached to clothing or equipment such as that disclosed in the Kivela patent, the lamp housing requires a specialized connector apart from the connector which attaches the lamp housing to the flashlight body in order to attach the lamp housing to the clothing or equipment of the user.

It is an object of the present invention to provide a flashlight where the lamp housing of the flashlight is easily separated from the body of the flashlight and where the electrical wiring connecting the lamp to the body is easily stored within the lamp housing. Furthermore, it is an object of the invention to provide a flashlight where a connector between the lamp housing and the flashlight body enables the lamp housing to be moved to a variety of adjusted positions relative to the flashlight body and the same connector, also enables the lamp housing to be separated from the body and attached to an article of clothing or equipment of the user of the flashlight.

SUMMARY OF THE INVENTION

The fire fighting flashlight of the present invention overcomes disadvantages of prior art flashlights employed in fire fighting situations by providing a flashlight specifically constructed to combine a variety of features that together enhance the flashlight's use as a fire fighting tool. The fire fighting flashlight of the present invention is generally comprised of a body portion configured to contain a source of power and to securely support and position the flashlight on a variety of surfaces, and an illuminating lamp portion removably attachable to, and capable of being operated separately from, the body portion.

The flashlight body is molded with a central void or opening defined by a pair of hollow tubular side members that are interconnected by a pair of transverse members in a substantially parallel and laterally spaced relationship. Each of the tubular members contains circuitry to connect pluralities of dry cell batteries, rechargeable batteries, or specialized battery packs contained inside the tubular members with the lamp of the flashlight. The transverse members interconnect the tubular members in a spaced relationship with the open void between the tubular members providing ample room for the insertion of a gloved hand of the fire fighter into the void when gripping either of the tubular members.

The configuration of the body portion is such that it can be placed on a surface with the tubular members positioned upright to elevate the lamp above the surface, or placed with the tubular members against the surface to provide more stable support for the flashlight. In either of these two positions, the lamp is adjustable in relation to the body to a number of positions to direct the beam of light projected from the lamp in a variety of directions.

The lamp may be removed from the body of the flashlight thereby permitting the weight of the batteries contained in the tubular members to be carried in a convenient fashion while the lighter weight of the lamp may be more comfortably attached to a helmet, belt, or other structure.

The construction of the flashlight is both economical and simplified by the unique construction of the connector mechanism that removably attaches the lamp housing to the flashlight body. This same connector mechanism is also used for holding the lamp housing in several different adjusted positions on the flashlight housing, and for attaching the lamp housing to the clothing or equipment of the user when it is separated from the flashlight body.

The lamp, when separated from the body of the flashlight, is still connected to the body by a length of electrical cable extending from the body into the lamp and providing electrical power from the batteries to the lamp. The lamp housing further comprises a spool contained therein for storing a portion of the electrical cable. The portion of the electrical cable contained in the lamp housing is wound on the spool enabling the cable to be unreeled from the spool when separating the lamp from the body of the flashlight, and conveniently reeled back on to the spool when attaching the lamp to the body.

Alternatively, the entire body of the flashlight may be suspended from an article of clothing or equipment worn by the fire fighter while the lamp is attached to the body of the flashlight. While attached, the lamp is capable of being adjusted relative to the body to direct the beam of light in a variety of directions while freeing up the hands of the fire fighter. The ability to adjust the direction of the lamp beam, while the lamp is attached to the body of the flashlight, enables the flashlight to be carried by or suspended on the fire fighter in any manner most comfortable to the fire fighter with the lamp beam adjusted to the desired direction.

BRIEF DESCRIPTION OF THE DRAWINGS

Further objects and features of the present invention are revealed in the following detailed description of the preferred embodiment of the invention and the drawing figures wherein.

DETAILED DESCRIPTION OF THE PREFERRED EMBODIMENT

Figure 1:
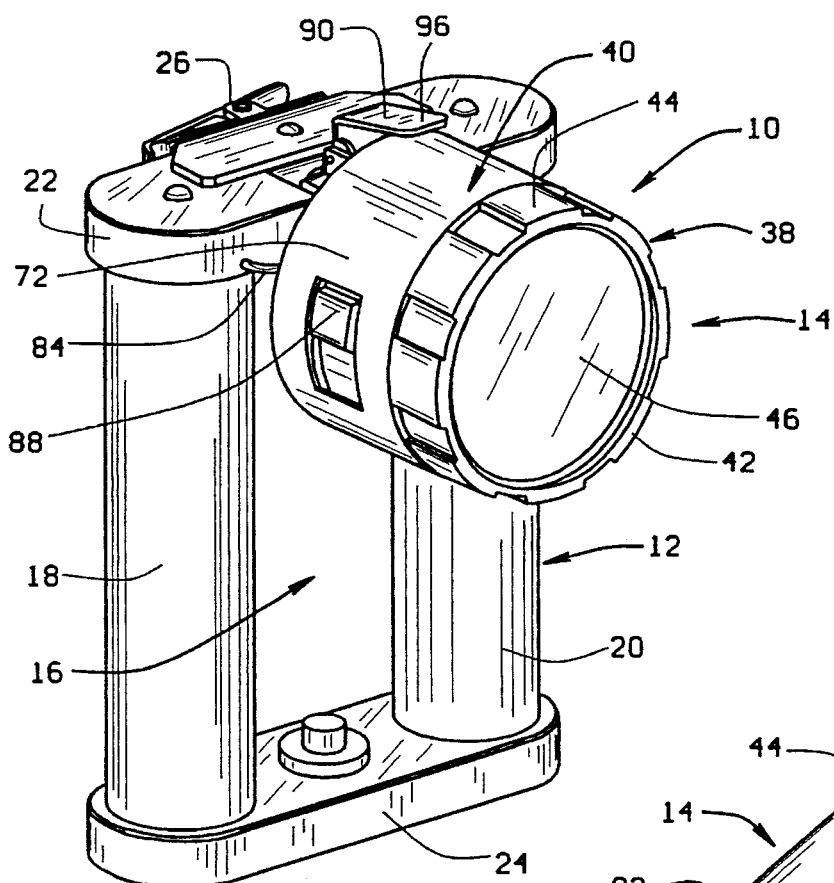
FIG. 1 is an isometric view of the flashlight of the present invention shown with the lamp attached to the body.
Figure 2:
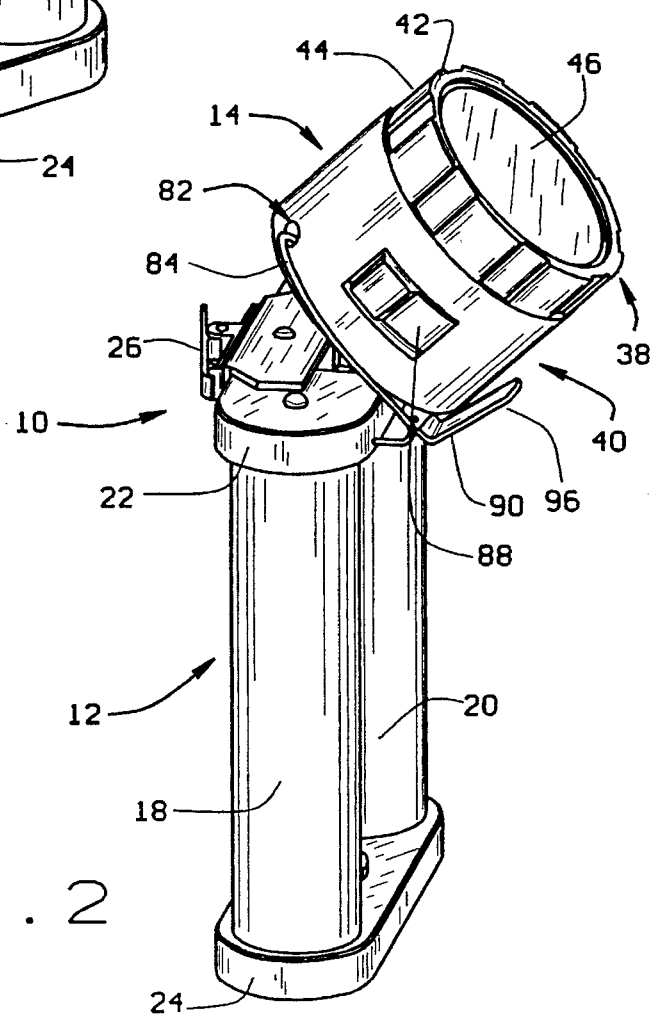
FIG. 2 is an isometric view of the flashlight shown with the lamp attached to the body and adjusted upwardly from the body.

The flashlight 10 of the present invention is best seen in FIGS. 1 and 2. As shown in FIG. 1, the flashlight is generally comprised of a body portion 12 and a lamp portion 14. The lamp portion 14 is removably attached to the body portion 12 for adjustable movement relative thereto, and for electrical communication between circuitry contained in the lamp portion 14 and body portion 12 as will be explained later. The flashlight may be constructed from metal or plastic or any combination of these materials.

The body portion 12 of the flashlight is substantially identical to that disclosed in the U.S. Pat. Nos. 5,239,451 and 5,357,411, assigned to the assignee of the present invention and incorporated herein by reference. Therefore, it will be described here in only general detail.

The body portion 12 is molded with a central void 16 defined by a pair of body members 18, 20 that are interconnected by a pair of transverse members 22, 24 in a substantially parallel and laterally spaced relationship. The transverse members 22, 24 interconnect the body members 18, 20 in a spaced relationship with the open void 16 between the body members providing ample room for the insertion of a gloved hand into the void 16 when gripping either of the body members. Each of the tubular body members 18, 20 are cylindrical and have interior diameters dimensioned sufficiently large to accommodate a power source of the flashlight in the form of C or D-size dry cell batteries, rechargeable batteries, or specialized battery packs. When the phrase "power source" is used herein, it should be understood to mean any one of these types of power sources.

Figure 3:
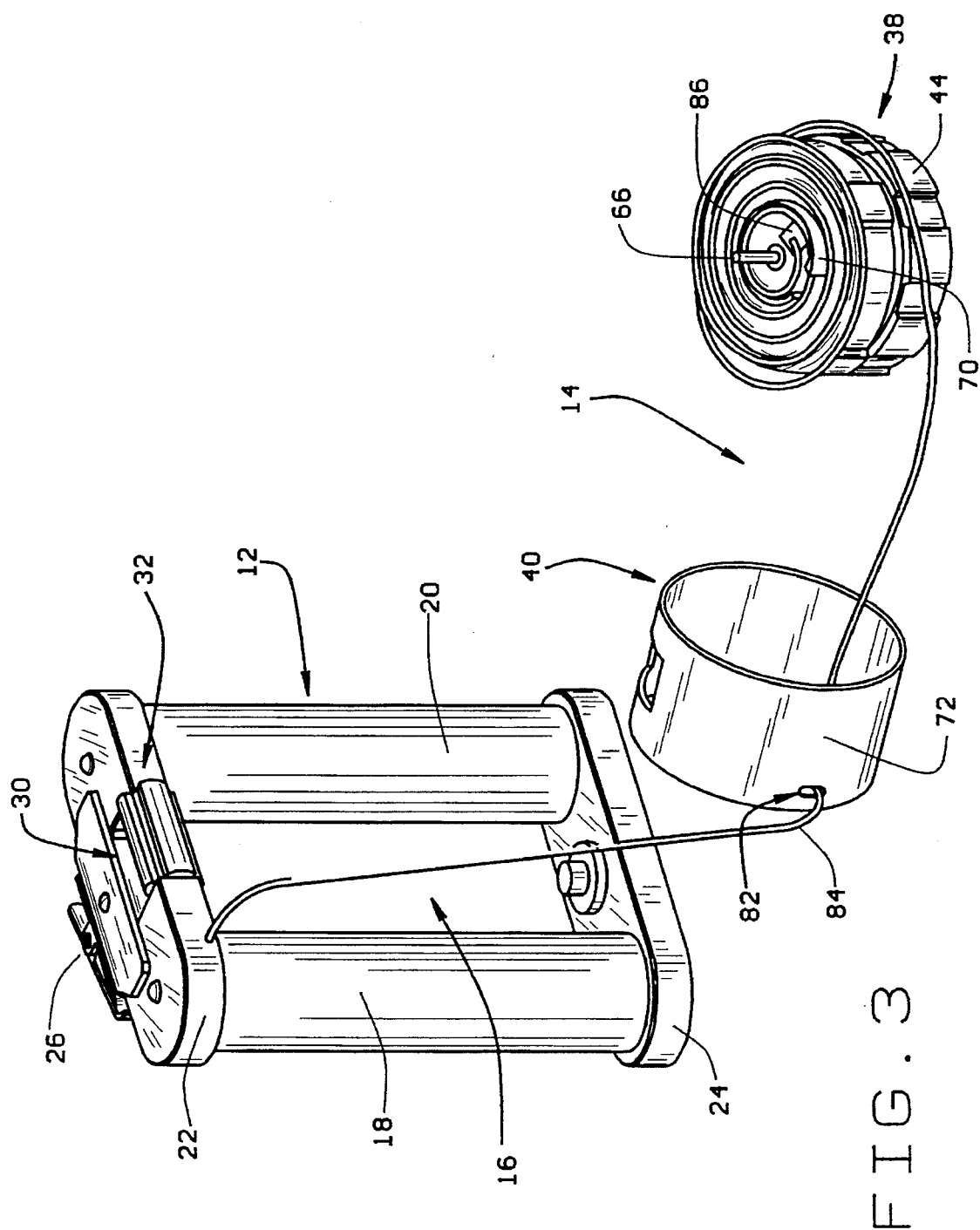
FIG. 3 is an isometric view of the flashlight shown with the lamp separated from the body, the lamp being removed from the lamp housing to expose the cable spool.

The top transverse member 22 extends laterally between the topmost ends of the pair of tubular body members 18, 20 as viewed in FIGS. 1 through 3. The interior of the top transverse member is hollow and contains the electrical circuitry interconnecting the circuitry of the tubular members with the circuitry of the lamp portion 14 yet to be explained. A clip 26 is mounted for rotation on the back of the transverse member 22. The clip 26 is sufficiently large to suspend the flashlight when attached to an object.

The bottom transverse member 24 is connected between the opposite ends of the tubular body members 18, 20 from the top transverse member. The bottom transverse member also serves as a closure member and a support base for the flashlight.

Figure 4:
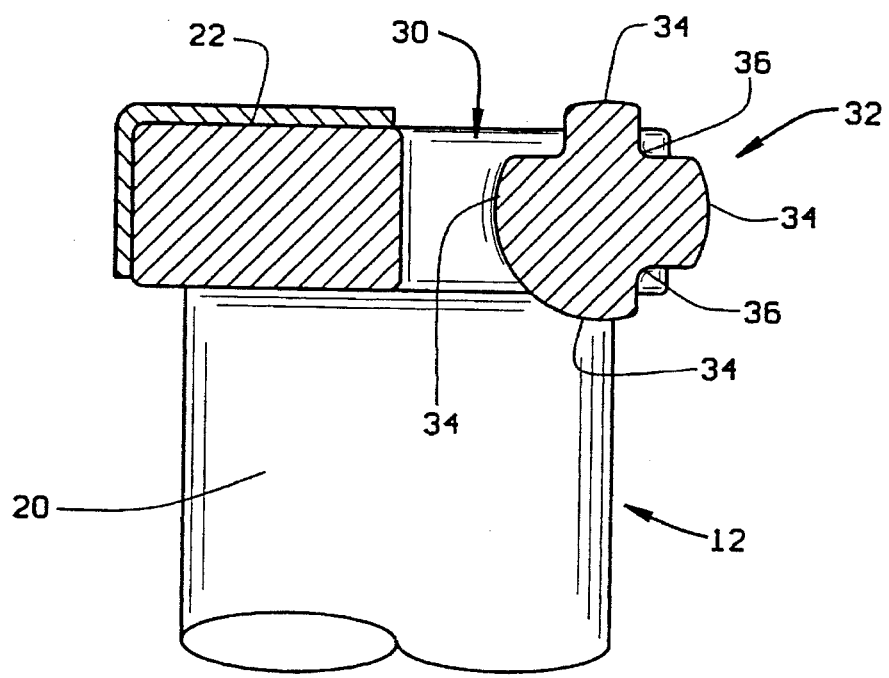
FIG. 4 is a partial side view, in section, showing the upper transverse member of the body of the flashlight and the mandrel.

As best seen in FIGS. 3 and 4, the top transverse member 22 is formed with a generally rectangular open notch 30 intermediate the front face of the transverse member. A mandrel 32 spans the notch at the front of the transverse member and is connected to the transverse member on opposite sides of the notch. The mandrel 32 has a generally cylindrical exterior surface 34 with three grooves 36 formed in the mandrel surface and extending across the mandrel between its connections to the transverse member 22. As seen in FIG. 4, the mandrel grooves 36 are positioned in the exterior surface of the mandrel spaced from each other to obtain the desired orientation of the lamp portion 14. As will be explained, portions of the mandrel exterior surface within each of the grooves 36 function as abutments that hold the lamp portion 14 of the flashlight in several adjusted positions relative to the body portion 12 of the flashlight.

Figure 11:
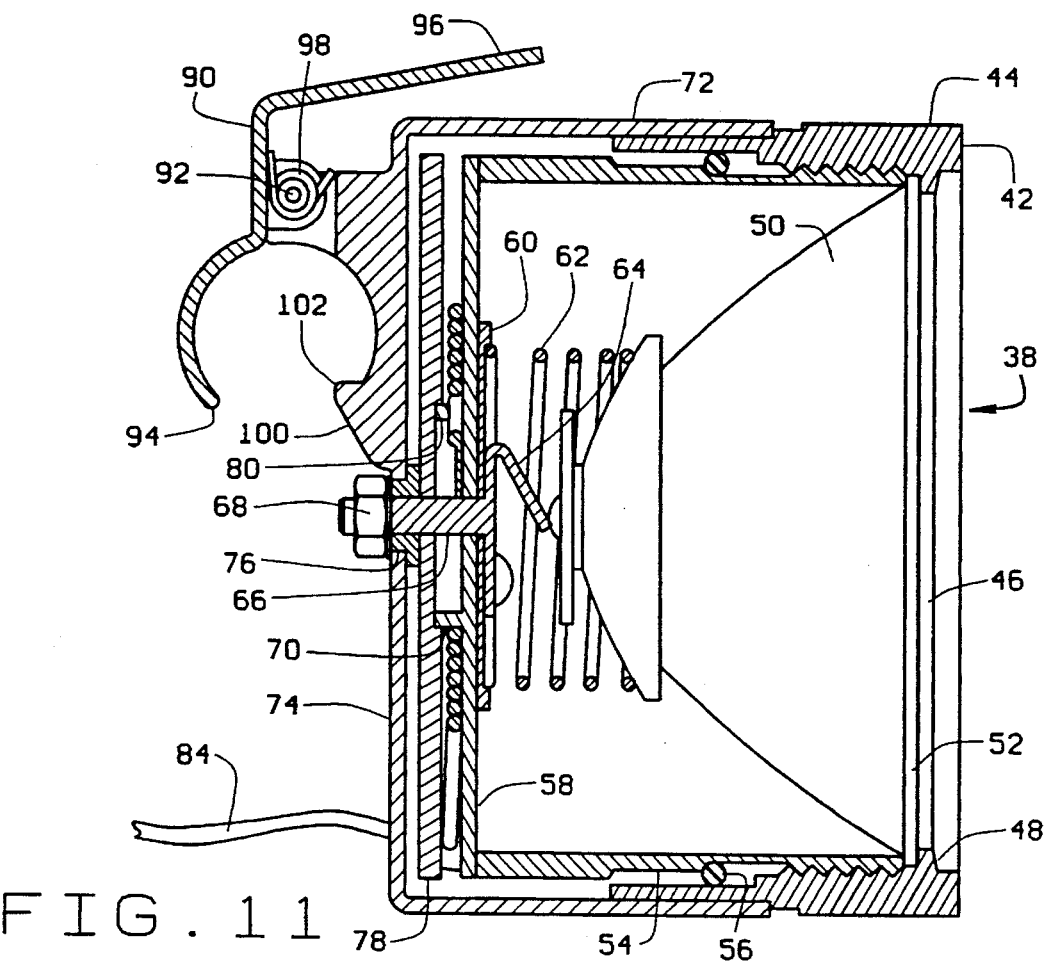

As shown in FIG. 3, the flashlight lamp portion 14 is contained in a housing having a front section 38 and a rear section 40. The front and rear sections are separable from each other. Referring to FIG. 11, the lamp housing front section 38 includes an annular ring 42 with an exterior surface 44. A transparent, circular lens 46 is held within a circular rim 48 of the annular ring 42. A reflector 50 having a general cone shape with an annular flange 52 at its forward periphery is positioned against an interior surface of the circular rim 48. The reflector 50 contains the lamp bulb (not shown) and provides the electrical connections to the bulb in the same manner as conventional flashlight reflectors.

An interior casing extends rearwardly from the annular ring 42 and contains the reflector 50. The interior casing includes a cylindrical sidewall 54 that is screw threaded into the interior of the annular ring 42. An 0-ring 56 is positioned between the exterior surface of the cylindrical sidewall 54 and the interior surface of the annular ring 42 and provides a water tight seal between these two surfaces and the screw threaded connection of the side wall and annular ring. The screw threaded connection of the side wall and annular ring holds the reflector flange 52 tight against the circular rim 48 of the annular ring. The interior casing also includes a circular end wall 58 at the opposite end of the cylindrical side wall 54 from its engagement with the reflector flange 52. A disk of insulating material 60 is attached to an interior surface of the circular end wall 58. A coil spring 62 engages against the disk 60 at one end and against the reflector 50 at its opposite end. The coil spring 62 and the reflector 50 provide one of the paths of electrical communication to the bulb (not shown) contained within the reflector 50 as is commonly done in flashlight constructions. A second conductor 64 is also attached to the interior casing end wall 58 and is insulated from the end wall by the insulating material 60. The second conductor 64 is separated from the coil spring 62 which surrounds the conductor. The second conductor 64 provides the second path of electrical communication to the bulb (not shown) contained within the reflector 50. A cylindrical post 66 extends from the second conductor 64 through a hole in the center of the interior casing end wall 58 and through a hole in the lamp housing rear section 40. A nut fastener 68 is screw threaded onto the end of the post 66, securing the lamp housing front section 38 to the lamp housing rear section 40 for relative rotation between these two housing sections. Projecting from the rearward surface of the interior housing end wall 58 and surrounding the second conductor post 66 is a cylindrical stem 70 that functions as a spool around which is wound the wiring connecting the lamp portion 14 to the body portion 12 as will be explained.

The lamp housing rear section 40 has a cylindrical side wall 72 with a circular end wall 74 closing its rearward end and being left open at its forward end. The second conductor post 66 extends through a center hole in the rear housing section end wall 74 and thereby mounts the front housing section 38 to the rear housing section 40 for relative movement between these two sections. A forward portion of the rear housing section side wall overlaps a rearward portion of the front housing section side wall 44, forming a sliding friction engagement between these two housing sections that permits their relative rotation. By holding the exterior surfaces of the side walls of the front and rear housing sections, the entire interior casing of the front housing section 38, including the cylindrical stem 70, rotates relative to the rear housing section 40. The interior of the rear housing section 40 has a sleeve bearing 76 that surrounds the second conductor post 66 and passes through the end wall 74. The bearing 76 has an annular flange that engages against a circular spool end wall 78 and spaces the spool end wall 78 from the lamp housing end wall 74. The surface of the spool end wall 78 facing the front housing section 38 has a circular recess 80 formed at its center. The recess 80 is dimensioned to receive the cylindrical stem 70 of the front housing section therein. As the front housing section 38 is rotated relative to the rear housing section 40, the cylindrical stem 70 of the front housing section rotates with the spool end wall 78. The side wall 72 of the rear housing section has an aperture 82 passing therethrough. The aperture 82 is dimensioned sufficiently large to allow a cable 84 to pass through the aperture.

The cable 84 provides electric communication from the power source contained in the body portion 12 of the flashlight to the bulb (not shown) contained in the reflector 50 of the lamp portion 14 of the flashlight. As best seen in FIGS. 3 and 11, the cable passes through the aperture 82 in the lamp housing and is wound around the cylindrical stem 70 at the rear of the lamp housing front section 38. One of the leads of the cable attaches to the second conductor post 66 and the other lead attaches to a connector 86 that is in electrical communication with the spring 62 in the lamp housing, thereby establishing electric communication with the bulb (not shown) contained in the reflector 50 of the lamp. In the preferred embodiment, a switch 88 (see FIG. 1) is mounted on the exterior of the lamp housing rear section 40 and is connected to one of the leads of the coaxial cable 84 for manual on/off operation of the lamp. Alternatively, the switch could be mounted on the body portion of the flashlight.

By holding the housing rear section 40 in one hand, the user of the flashlight can spool out a length of the cable 84 from the lamp portion 14 by pulling on the portion of the cable that extends from the lamp housing aperture 82. This will cause the lamp housing front section 38 to rotate within the lamp housing rear section 40 as the length of cable 84 is pulled through the aperture 82 and unwound from the cylindrical stem 70. To rewind the cable on the stem, the user of the flashlight rotates the front housing section 38 relative to the rear housing section 40, causing the length of cable 84 to be pulled through the aperture 82 and wound around the cylindrical stem 70. In this manner, the lamp portion 14 of the flashlight provides a convenient mechanism for storing the length of cable 84 communicating the lamp portion 14 with the body portion 12.

Figure 5:
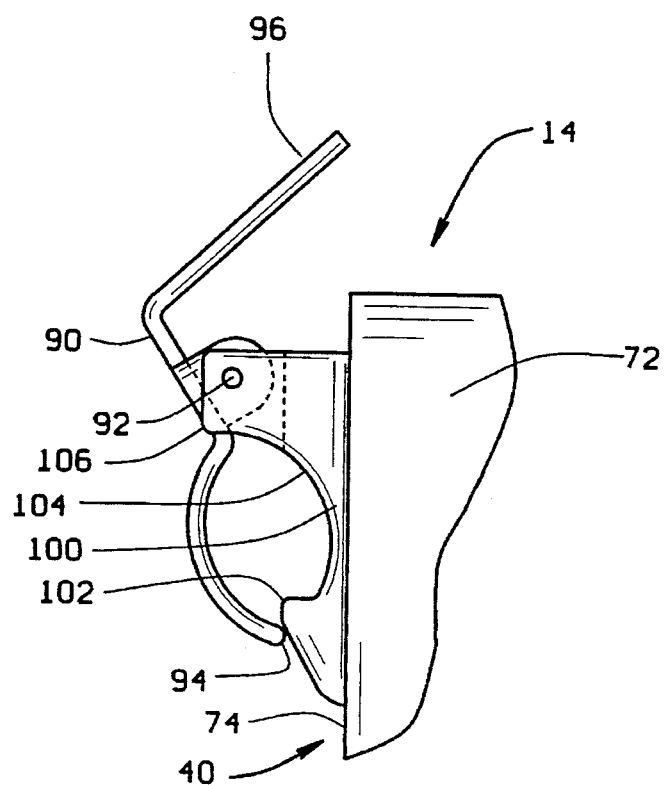
FIG. 5 is a partial side view of the lamp housing showing the clamp in its closed configuration.

A clamp 90 is mounted on the end wall 74 of the lamp rear section 40 by a pivot pin 92. The clamp has a curved configuration at one end that terminates in an end engagement surface 94. A projecting tab 96 is formed at the opposite end of the clamp. The projecting tab 96 has an angled configuration that extends the tab out over the exterior surface of the housing rear section 40 where it is easily accessible by a user of the flashlight. A coil spring 98 is mounted around the pivot pin 92 and biases the clamp in a counterclockwise direction as viewed in FIG. 11. As shown in FIG. 11, the clamp 90 is pivoted against the bias of the coil spring 98. FIG. 5 shows the clamp biased to its closed position.

A projection 100 extends from the end wall 74 of the rear housing section. The projection has a lower engagement surface 102 that is positioned to engage against the clamp engagement surface 94 when the clamp is bias closed by the spring 98. By positioning a portion of a fire fighter's equipment, or an article of clothing, or another object between the clamp engagement surface 94 and the lower engagement surface 102, the bias of the spring 98 will securely hold the object between these engagement surfaces, thereby suspending the flashlight lamp portion 14 from the object. The projection also has an upper engagement surface 106 that is separated from the lower engagement surface 102 by a curved surface 104 of the projection.

The configuration of the clamp engagement surface 94 and the configurations of the lamp housing lower engagement surface 102, curved surface 104 and upper engagement surface 106 are specifically designed to enable the lamp portion 14 to be clamped to the body portion mandrel 32 in a variety of adjusted positions of the lamp portion relative to the body portion. Several of the adjusted positions of the lamp portion are shown in FIGS. 6–10.

Figure 6:
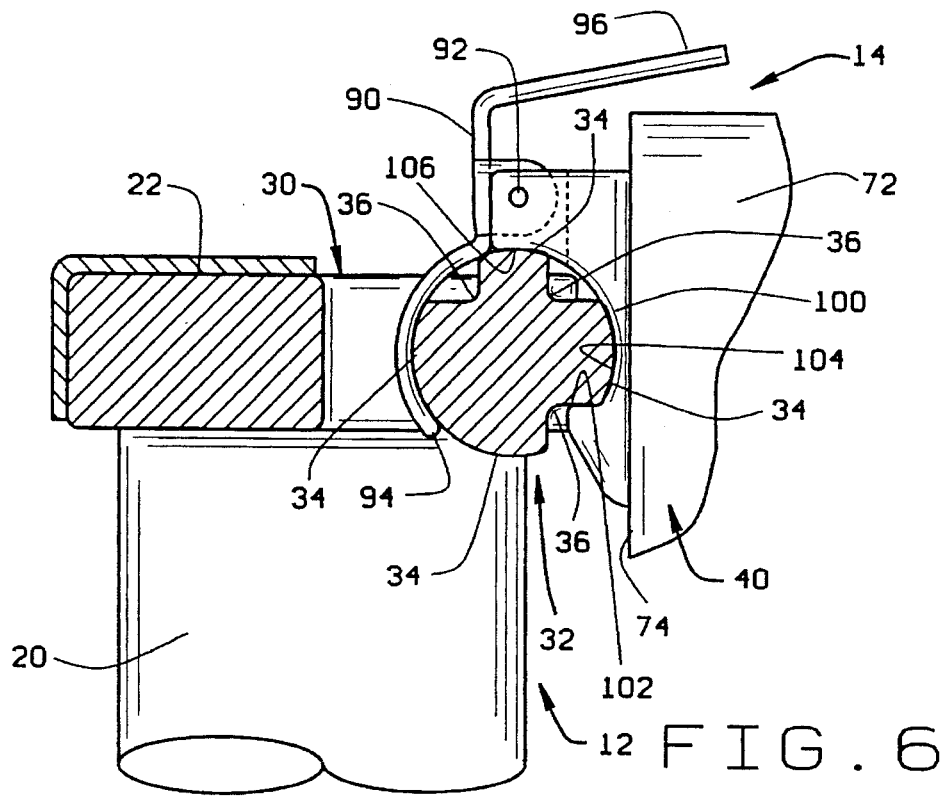
FIGS. 6–10 are partial views of the lamp housing attached to the flashlight body in its various adjusted positions; and, FIG. 11 is a side view, in section, of the lamp housing.

In FIG. 6, the lamp portion 14 is shown connected to the mandrel 32 with the lamp directed horizontally outwardly relative to the vertically positioned body portion. The lamp lower engagement surface 102 engages underneath one of the mandrel grooves 36. The curved, concave surface 104 of the lamp housing projection 100 engages over the generally cylindrical surface of the mandrel 32. The curved configuration of the clamp 90 also engages over a portion of the cylindrical exterior surface of the mandrel 32. The engagement of the lamp and clamp surfaces over the mandrel surface and engagement of the lamp engagement surface 102 in the mandrel groove 36 securely holds the lamp in the adjusted position shown in FIG. 6 relative to the flashlight body portion.

Figure 7:
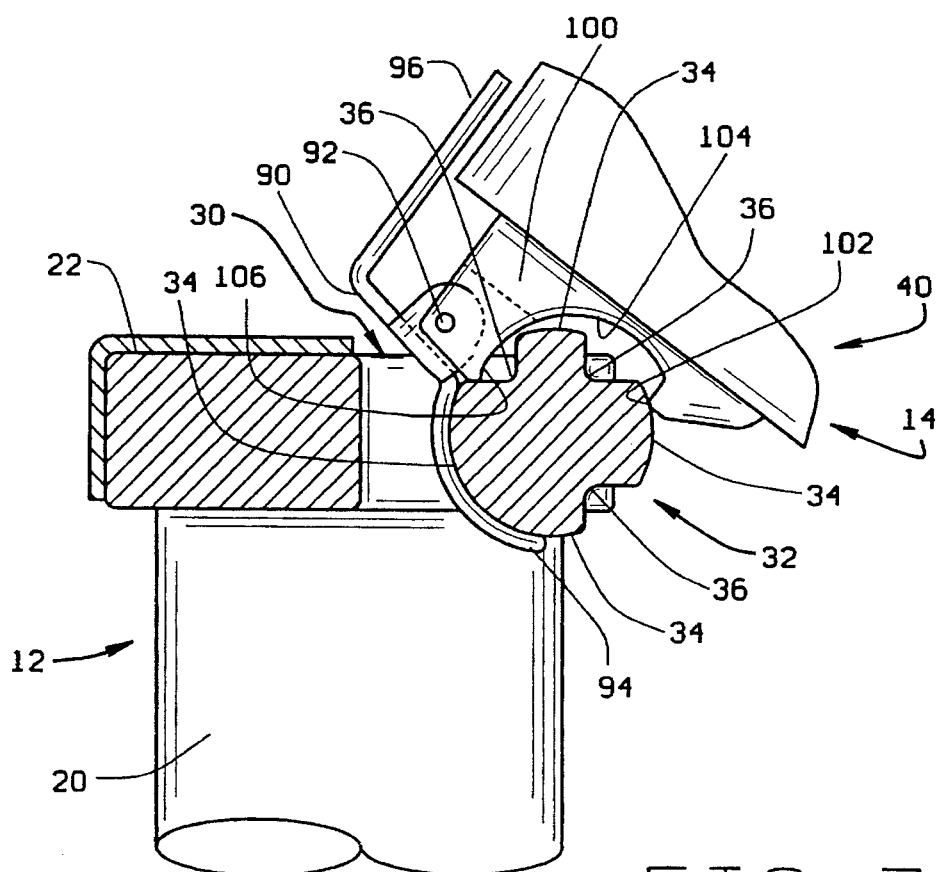

FIG. 7 shows the lamp portion 14 oriented at an upward angle relative to the vertically positioned body portion 12. In this orientation of the lamp portion, the upper engagement surface 106 of the lamp projection 100 engages in a groove 36 of the mandrel. The lower engagement surface 102 engages against the cylindrical exterior surface of the mandrel, and the curved portion of the clamp 90 engages over the mandrel exterior surface.

Figure 8:
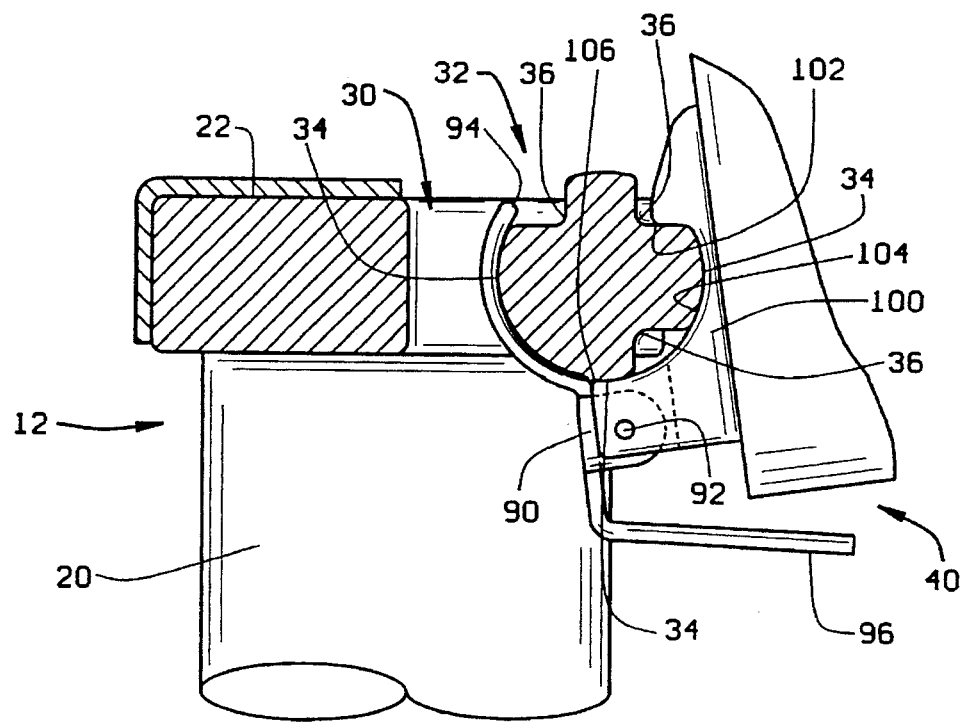

FIG. 8 shows the orientation of the lamp portion 14 relative to the body portion 12 shown in FIG. 6, the difference being that the lamp portion is now inverted from its orientation shown in FIG. 6. The engagement between the mandrel surfaces and grooves and the lamp engagement surfaces and the clamp are substantially the same as that shown in FIG. 6.

Figure 9:
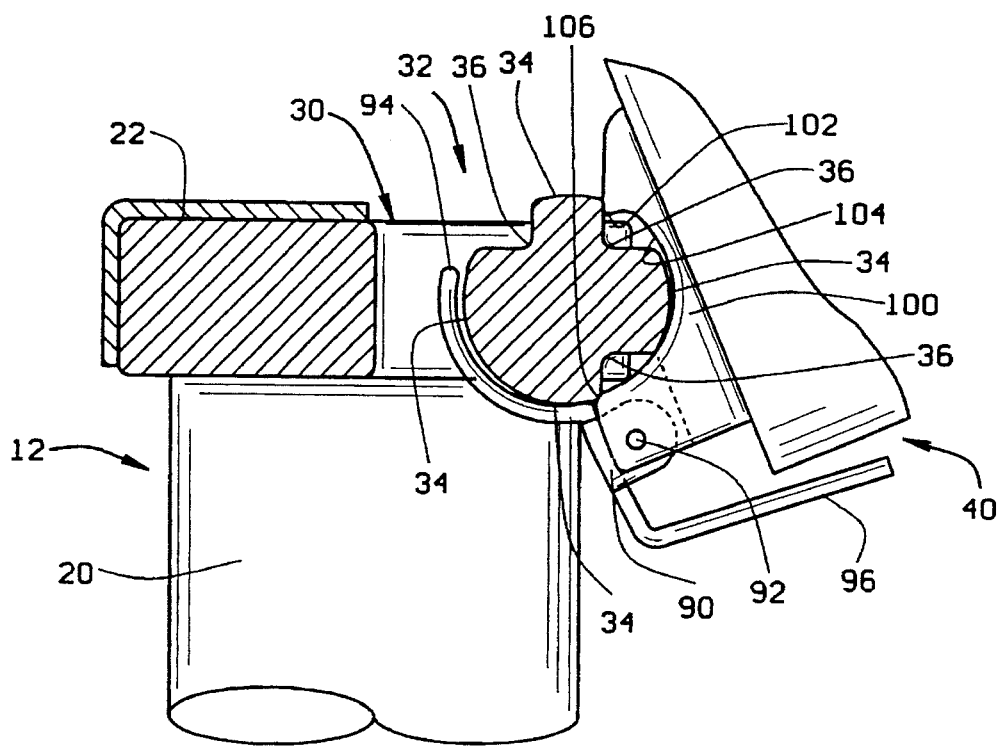

The orientation of the lamp portion 14 relative to the body portion 12 shown in FIG. 9 is substantially the same as that shown in FIG. 7, except that the lamp is inverted from its orientation shown in FIG. 7. In this position of the lamp, its upper engagement surface 106 engages in one of the mandrel grooves 36 and the curved portion of the clamp 90 engages over the mandrel exterior surface.

Figure 10:
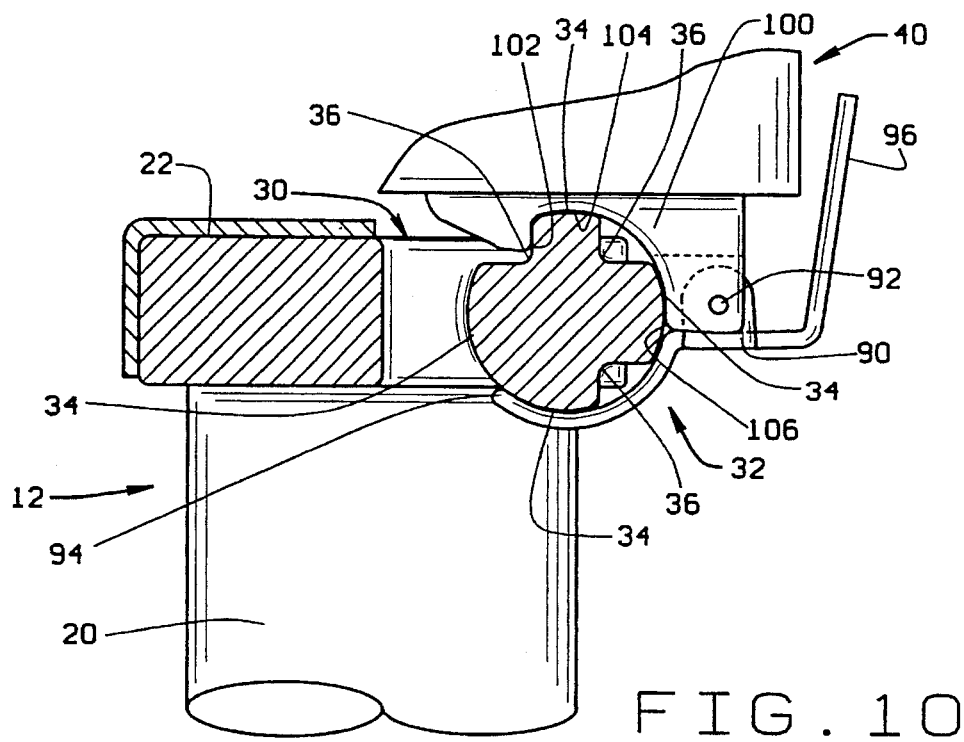

FIG. 10 shows the lamp portion 14 directed vertically upwardly relative to the vertically positioned body portion 12. In this orientation of the lamp, its lower engagement surface 102 engages in one of the mandrel grooves and the lamp curved surface 104, as well as the clamp curved surface, engage over portions of the mandrel exterior surface separated by the grooves.

In each of the orientations of the lamp portion 14 relative to the body portion 12 shown in the drawing figures and discussed above, one of the lamp upper 106 and lower 102 engagement surfaces engages in one of the grooves of the mandrel to positively hold the lamp in its adjusted position relative to the body. However, the position of the lamp relative to the body can be continuously adjusted between the positively held adjusted positions of the lamp. The friction engagement of the lamp curved surface 104 and the curved surface of the clamp 90 over the portions of the mandrel exterior surface 34 holds the lamp in its continuously adjustable positions relative to the flashlight body portion. In each of the adjusted positions shown and described above, the lamp can be easily disconnected from the mandrel by manually pressing the clamp projecting tab 96 toward the exterior surface of the lamp housing against the bias of the spring 98. This extends the curved portion of the clamp 90 away from the lamp housing projection 100 a sufficient distance to enable separation of the lamp portion 14 from the body portion 12.

While the present invention has been described by reference to a specific embodiment, it should be understood that modifications and variations of the invention may be constructed without departing from the scope of the invention defined in the following claims.

What is claimed:

1. A flashlight comprising:

a casing having at least one battery housing therein;

a mandrel on the casing;

a lamp housing having an electric light mounted therein;

a length of wire extending from the casing and into the lamp housing providing electrical communication between the battery housing and the electric light, a portion of the length of wire is contained in the lamp housing and is removable from the lamp housing to separate the lamp housing from the casing, and is returnable into the lamp housing when positioning the lamp housing proximate to the casing; and a clamp on the lamp housing, the clamp having a configuration for removably attaching the clamp to the mandrel and thereby removably attaching the lamp housing to the casing.

2. The flashlight of claim 1, wherein:

the clamp attaches the lamp housing to the casing for movement of the lamp housing through a plurality of adjusted positions relative to the casing.

3. The flashlight of claim 2, wherein:

the mandrel has an exterior surface with a plurality of abutments formed thereon, and the clamp has an end surface that engages against each of the plurality of abutments formed in the mandrel to hold the lamp housing in each of its plurality of adjusted positions relative to the casing.

4. The flashlight of claim 2, wherein:

the clamp is mounted on the lamp housing for pivoting movement relative to the lamp housing, the clamp has an end surface and a spring that biases the end surface toward the lamp housing whereby an object can be gripped between the clamp end surface and the lamp housing.

5. The flashlight of claim 4, wherein:

the clamp has a projecting tab opposite the end surface of the clamp, the tab projects along and is spaced from an exterior surface of the lamp housing, and manually pressing the tab toward the lamp housing causes the clamp end surface to move away from the lamp housing, and manually releasing the tab causes the spring to bias the clamp end surface toward the lamp housing.

6. The flashlight of claim 1, wherein:

the lamp housing has a spool contained therein for rotation of the spool relative to the lamp housing, the portion of the length of wire contained in the lamp housing is wound on the spool enabling the portion of the wire to be played out from the lamp housing by unreeling the portion of the wire from the spool, and enabling the portion of the wire to be drawn into the lamp housing by reeling the portion of wire onto the spool.

7. The flashlight of claim 6, wherein:

the spool is mounted in the lamp housing to rotate freely in the lamp housing in response to the portion of the wire being pulled from the lamp housing to thereby unreel the portion of the wire from the spool.

8. The flashlight of claim 6, wherein:

the lamp housing has a forward and a rearward section that are connected together for relative rotation of the forward and rearward sections, and the spool is connected to one of the forward and rearward sections for rotation relative to the other of the forward and rearward sections in response to relative rotation of the forward and rearward sections, thereby drawing the portion of wire into the lamp housing and reeling the portion of wire onto the spool.

9. A flashlight comprising:

a casing having at least one battery housing therein;

a mandrel on the casing;

a lamp housing having an electric light mounted therein, the electric light being connected in electrical communication with the battery housing; and a clamp on the lamp housing, the clamp being manually movable to attach the clamp to the mandrel and thereby attach the lamp housing to the casing for movement of the lamp housing through a plurality of adjusted positions relative to the casing, and the clamp being manually movable to remove the clamp from the mandrel and thereby separate the lamp housing from the casing, and the clamp having a configuration that enables the clamp to attach the lamp housing to an object when the clamp is removed from the mandrel.

10. The flashlight of claim 9, wherein:

the clamp is mounted to the lamp housing for pivoting movement relative to the lamp housing, the clamp has an end surface and a spring that biases the end surface toward the lamp housing and enables the clamp to attach the lamp housing to an object held between the lamp housing and the clamp end surface under the bias of the spring.

11. The flashlight of claim 9, wherein:

the mandrel has an exterior surface with a plurality of abutments formed thereon, and the clamp has an end surface that engages against each of the plurality of abutments formed in the mandrel to hold the lamp housing in each of its plurality of adjusted positions relative to the casing.

12. The flashlight of claim 11, wherein:

the clamp is mounted on the lamp housing for pivoting movement of the clamp relative to the lamp housing, the clamp has a configuration that engages over the mandrel exterior surface and a spring biases the clamp in engagement over the mandrel exterior surface and biases the clamp end surface into engagement with the plurality of abutments formed on the mandrel exterior surface.

13. The flashlight of claim 9, wherein:

a length of wire extends from the casing and into the lamp housing and provides the electrical communication of the electric light with the battery housing, and a portion of the length of wire is contained in the lamp housing and is extendable from the lamp housing to separate the lamp housing from the casing, and the portion of the wire extending from the lamp housing is retractable back into the lamp housing.

14. The flashlight of claim 13, wherein:

the lamp housing has a spool contained therein for rotation of the spool relative to the lamp housing, the portion of the length of wire contained in the lamp housing is wound on the spool enabling the portion of the wire to be played out from the lamp housing by unreeling the portion of the wire from the spool, and enabling the portion of the wire to be drawn into the lamp housing by reeling the portion of wire onto the spool.

15. The flashlight of claim 14, wherein:

the lamp housing has a forward and a rearward section that are connected together for relative rotation of the forward and rearward sections, and the spool is connected to one of the forward and rearward sections for rotation relative to the other of the forward and rearward sections in response to relative rotation of the forward and rearward sections, thereby drawing the portion of wire into the lamp housing and reeling the portion of wire onto the spool.

16. A flashlight comprising:

a casing having at least one battery housing therein;

a mandrel on the casing, the mandrel having an exterior surface with a plurality of abutments formed thereon and spatially arranged around the mandrel;

a lamp housing having an electric light mounted therein, the electric light being connected in electrical communication with the battery housing; and, a clamp on the lamp housing, the clamp having a configuration that engages over the mandrel and mounts the lamp housing to the casing for movement of the lamp housing through a plurality of adjusted positions relative to the casing, the clamp having an end surface that engages against each abutment and holds the lamp housing in each adjusted position relative to the casing.

17. The flashlight of claim 16, wherein:

the clamp is mounted to the lamp housing for pivoting movement relative to the lamp housing, and the clamp has a spring that biases the clamp end surface against each abutment and holds the lamp housing in each adjusted position relative to the casing.

18. The flashlight of claim 17, wherein:

the clamp is movable against the spring bias to remove the clamp from engagement with the mandrel and thereby enable separating the lamp housing from the casing.

19. The flashlight of claim 18, wherein:

the spring biases the clamp end surface into engagement with the lamp housing whereby an object can be gripped between the clamp end surface and the lamp housing when the lamp is removed from the casing.

20. The flashlight of claim 16, wherein:

a length of wire extends from the casing and into the lamp housing and provides the electrical communication of the electric light with the battery housing, and a portion of the length of wire is contained in the lamp housing and is extendable from the lamp housing to separate the lamp housing from the casing, and the portion of the wire extending from the lamp housing is retractable back into the lamp housing.

21. The flashlight of claim 20, wherein:

the lamp housing has a spool contained therein for rotation of the spool relative to the lamp housing, the portion of the length of wire contained in the lamp housing is wound on the spool enabling the portion of the wire to be played out from the lamp housing by unreeling the portion of the wire from the spool, and enabling the portion of the wire to be drawn into the lamp housing by reeling the portion of wire onto the spool.

22. The flashlight of claim 21, wherein:

the lamp housing has a forward and a rearward section that are connected together for relative rotation of the forward and rearward sections, and the spool is connected to one of the forward and rearward sections for rotation relative to the other of the forward and rearward sections in response to relative rotation of the forward and rearward sections, thereby drawing the portion of wire into the lamp housing and reeling the portion of wire onto the spool.

* * * * *